June 6, 1972   G. E. GOSLIN ET AL   3,667,718
ADJUSTABLE REAR VIEW MIRROR ASSEMBLY
Original Filed Oct. 25, 1968
2 Sheets-Sheet 1
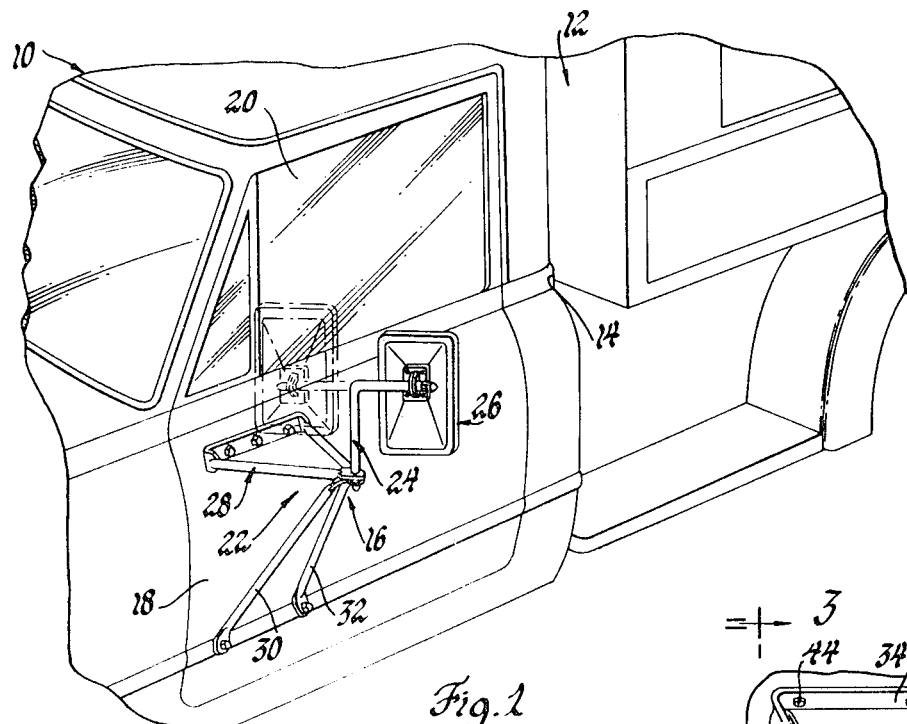
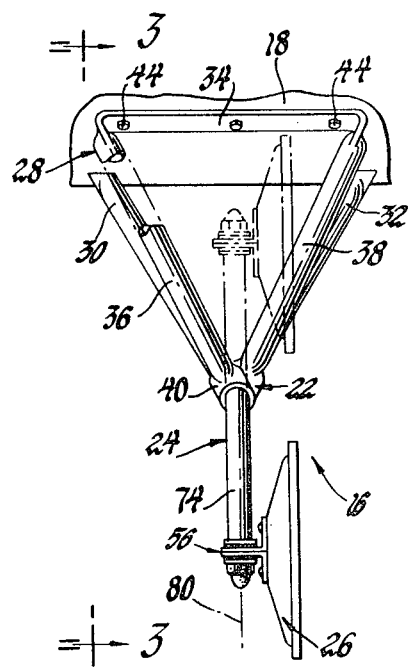
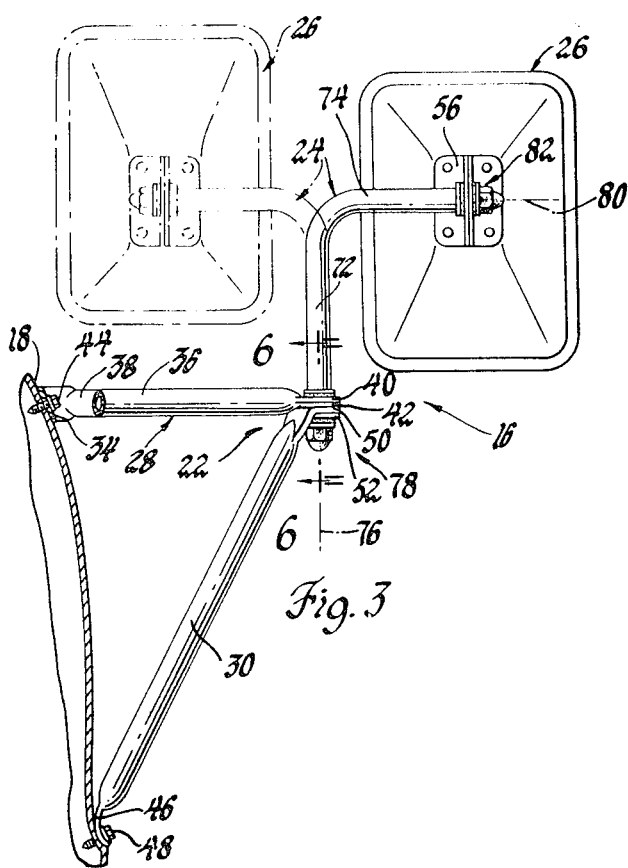
INVENTORS.
Gerald E. Goslin,
Russell R. Hershberger,
& George J. Mach
E. J. Biskup
ATTORNEY June 6, 1972 G. E. GOSLIN ET AL 3,667,718
ADJUSTABLE REAR VIEW MIRROR ASSEMBLY
Original Filed Oct 25, 1968 2 Sheets-Sheet 2
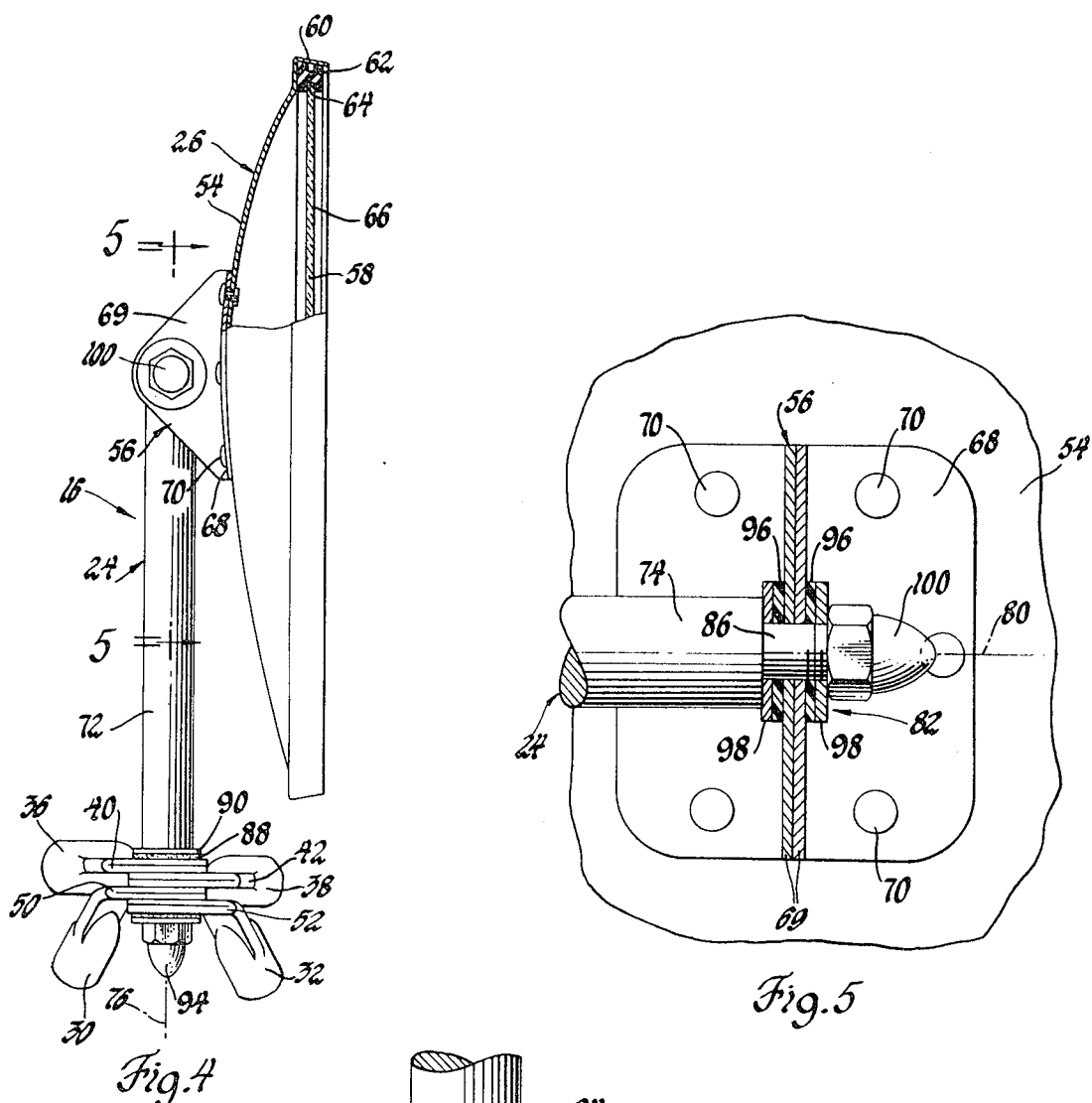
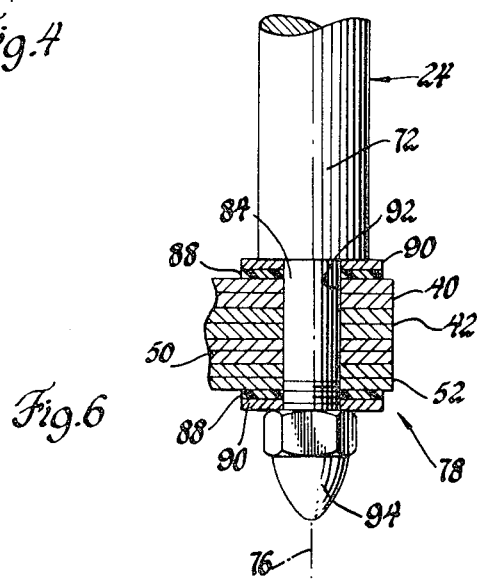
INVENTORS.
Gerald E. Goslin,
Russell R. Hershberger,
& George J. Mach
E. J. Biskup
ATTORNEY

United States Patent Office 3,667,718
Patented June 6, 1972

3,667,718
ADJUSTABLE REAR VIEW MIRROR ASSEMBLY
Gerald E. Goslin, Mount Clemens, Russell R. Hershberger, Birmingham, and George J. Mach, Berkley, Mich., assignors to General Motors Corporation, Detroit, Mich.
Continuation of abandoned application Ser. No. 770,522, Oct. 25, 1968. This application May 18, 1971, Ser. No. 144,595
Int. Cl. B60r 1/06
U.S. Cl. 248—487
7 Claims

ABSTRACT OF THE DISCLOSURE

A rear view mirror assembly for use on motor vehicles having an outwardly extending removable cargo includes an L-shaped support arm that has a lower leg supported at the vehicle door for rotation about a vertical axis and has an upper leg supporting a mirror element for rotation about a horizontal axis. The mirror element is movable between an inboard position used under normal driving conditions and an outboard viewing position used when a cargo is being carried by rotation of the support member about the vertical axis coupled with rotation of the mirror element about the horizontal axis.

---

This is a continuation of Ser. No. 770,522, filed on Oct. 25, 1968 now abandoned.

On vehicles such as trucks, tractor-trailers, and automobiles having carried or towed cargoes extending outwardly of the vehicle body, it is necessary to provide a rear view mirror assembly that gives the vehicle operator an adequate field of vision outwardly and to the rear of the cargo. However, under ordinary driving conditions, a mirror assembly should be located at an inboard viewing position adjacent the operator's window. Such a location enables the operator to properly reference his rearward field of vision with the vehicle body and, at the same time, comply with the applicable restrictions on maximum vehicle width.

The requirement for dual mirror positions most frequently arises on trucks having a removable cargo, such as a camper unit, stored in the truck bed. Under ordinary driving conditions, a conventional rear view mirror will provide an adequate rearward field of vision and, at the same time, comply with any restrictions on maximum vehicle width. When a cargo is being carried, however, a removable secondary or supplemental mirror assembly is necessary to achieve satisfactory outward and rearward vision on the left side of the vehicle. Moreover, a second supplemental mirror asesmbly is required for satisfactory rearward vision on the right side of the vehicle inasmuch as the cargo obscures vision through the rear window. As should be apparent, the need for two additional mirror assemblies is not altogether desirable.

While the movable mirror assemblies commonly used in large commercial trucking applications would provide a desirable unitary structure for use in inboard and outboard viewing, these structures are not altogether satisfactory on the smaller trucks or in instances where loads are towed behind an automobile. Ordinarily, these mirror assemblies have a movable mirror element connected between supports that are permanently attached above and below a vehicle window. In addition to requiring an elaborate supporting structure of braces and struts, the mirror elements obscure forward lateral vision when positioned at an inboard location.

The present invention overcomes the above noted problems by providing a rear view mirror assembly that is conventionally located in a position that does not impair forward lateral vision, easily movable between inboard and outboard viewing positions, and usable, without modification, on either the left or right side of the vehicle. To this end, the support structure for the mirror assembly is attached to the door below and toward the front of the window. An L-shaped mirror support bar has a lower vertical leg journalled at the outboard end of the support structure for a rotation about a vertical axis. A mirror unit is eccentrically supported at a horizontal extending upper leg of the support bar and is rotatable thereabout at an axis normal to the first axis. The L-shaped support bar is designed to locate the mirror reflecting surface below eye level in a position that does not block lateral forward vision and in combination with the normally disposed rotatable connections provides a mirror assembly that is movable between an inboard viewing position and an outboard viewing position simply by rotating the support arm coupled with a rotation of the mirror element. In this manner, the present mirror assembly can be easily and conveniently located in either of two viewing positions.

Moreover, because the mirror unit is eccentrically attached to the upper leg of the support bar, the reflecting surface is located above the vehicle door when the mirror assembly is mounted in the outboard position on the right side of the vehicle. Accordingly, the present mirror assembly can be used on either side of the vehicle without modification of the support bar.

Accordingly, the objects of the present invention are: to provide a rear view mirror assembly for use on a motor vehicle that is conventionally mounted on the vehicle door and easily movable between an inboard viewing position and an otuboard viewing position; to provide a rear view mirror assembly for use on motor vehicles having removable cargoes wherein a mirror support structure is mounted on a vehicle door panel adjacent the window and supports one leg of an L-shaped mirror support bar for rotation about a vertical axis, the support bar having a horizontally disposed leg which supports the mirror unit for rotation about a horizontal axis, the arrangement being such that the mirror unit is movable to an outboard viewing position for viewing rearwardly and outwardly of the cargo from an inboard viewing position by rotation of the support arm coupled with rotation of the mirror unit; and to provide a rear view mirror structure for use on either side of vehicles having removable outwardly extending loads wherein an L-shaped mirror support is connected at a vertically extending lower leg to a support structure attached to a vehicle door adjacent the window for rotation about a vertical axis and has a horizontally extending upper leg that eccentrically supports a mirror unit for rotation about a horizontal axis such that the mirror assembly is movable between an inboard position and an outboard position for viewing outwardly and to the rear of the load by angularly displacing the support arm and the mirror unit substantially 180° from their inboard positions.

These and other objects will be apparent to one skilled in the art upon reading the following detailed description, reference being made to the accompanying drawings in which:

FIG. 1 is a fragmentary perspective view of a motor vehicle incorporating a mirror assembly made in accordance with the present invention;

FIG. 2 is an enlarged top view of the mirror assembly shown in FIG. 1;

FIG. 3 is a view taken along line 3—3 of FIG. 2;

FIG. 4 is an enlarged partially sectioned side view of the mirror unit shown in FIG. 1;

FIG. 5 is an enlarged view taken along line 5—5 in FIG. 4; and

FIG. 6 is an enlarged view taken along line 6—6 of FIG. 3.

Referring to FIG. 1, there is shown a motor vehicle, such as a truck 10, having a cargo 12 removably mounted in a rearwardly located truck bed 14. The truck 10 includes a mirror assembly, generally indicated by the reference numeral 16, mounted on a front side door 18 to the front of and entirely below a window 20. In a manner to be described below, the mirror assembly 16 is movable to an outboard viewing position shown by the solid lines to enable the driver to view rearwardly of the cargo 12 and to an inboard viewing position shown by the phantom lines for ordinary rear viewing when the cargo 12 is removed. While the present invention will be described with reference to a truck incorporating a single mirror assembly and removable cargo unit, it will be appreciated that the same is equally adaptable, without modification, on the other side of the vehicle and can be used on automobiles having removable trailers and, in addition, in commercial trucking operations.

More specifically, the mirror assembly 16 comprises a support structure or base anchorage 22, a generally L-shaped support bar 24, and a mirror unit 26.

The support structure 22 generally comprises an outwardly extending triangular upper mounting bracket 28 and a lower mounting bracket including a pair of downwardly and diagonally extending struts 30 and 32. Referring to FIG. 2, the mounting bracket 28 is formed of a metallic tubing and includes a flattened base 34 terminating at the ends thereof with a pair of outwardly extending longitudinally converging struts or arms 36 and 38. The arms 36 and 38 have flattened ends 40 and 42, respectively, disposed in a vertically stacked relationship. As shown in FIGS. 2 and 3, the base 34 is fixedly attached to the vehicle door 18 to the front of and entirely below the window 20 by the means of fasteners 44. The struts 30 and 32 are similar in configuration and, as shown in FIG. 3, the strut 30 is formed of metallic tubing and has a flattened lower end 46 that is attached to a lower portion of the door 18 by fastener 48. The struts 30 and 32 extend outwardly from the lower ends and longitudinally converge at flattened upper ends 50 and 52, respectively, which are disposed in vertical stacked relationship with respect to the aforementioned ends 40 and 42.

Referring to FIG. 4, the mirror unit 26 comprises a dish-shaped metallic housing 54, a mounting bracket 56, and a mirror element 58. The mirror housing 54 rearwardly terminates with a rectangular inwardly turned peripheral rim 60 in which an elastomeric gasket 62 is nested. An inwardly facing groove 64 is formed in the gasket 62 which serves to locate and retain the marginal edge of the mirror element 58 in the housing 54. The mirror element 58 has a reflecting surface 66 formed thereon by chrome deposition or other suitable reflectorizing processes. The mounting bracket 56, as shown in FIG. 5, comprises a pair of L-shaped members having a vertically extending base plate 68 and longitudinally extending arms 69. The mounting bracket 56 is secured to the mirror housing 54 at the base plate 68 by rivets 70. The arms 69 are horizontally apertured for journalling the upper portion of the support bar 24. For purposes to be hereafter explained in detail, it will be noted that the bracket 56 is vertically offset with respect to the mirror housing 54.

Referring to FIG. 3, the support bar 24 is formed of a solid bar stock and includes a vertical lower leg 72 and a horizontal upper leg 74. The support bar 24 is rotatable with respect to the support structure 22 about a vertical axis 76 at a pin connection 78. The mirror unit 26 is rotatable with respect to the mirror support bar 24 about a horizontal axis 80 at a pin connection 82. As shown in FIG. 6, the lower leg 72 terminates in a threaded shank 84 of reduced diameter and, as shown in FIG. 5, the upper leg 74 has a threaded end 86 of reduced diameter.

Referring to FIG. 6, the pin connection 78 includes a pair of plastic washers 88 and a pair of metallic washers 90. The washers 88 and 90 and the flattened ends 40, 42, 50 and 52 are centrally apertured to form a vertically disposed opening 92. The threaded end 84 is inserted through the opening 92 and has a crown nut 94 threaded over its exposed end to axially restrain the leg 72 in assembly. Thus, the pin connection 78 will accommodate controlled arcuate movement of the support bar 24 relative to the support srtucture 22 about the vertical axis 76.

Similar to the pin connection 78, the pin connection 82, as shown in FIG. 5, includes a pair of plastic washers 96 and a pair of metallic washers 98. The washers 96 and 98 and the forwardly extending legs of the bracket 56 are centrally apertured and threaded end 86 of the upper leg 72 is inserted therethrough. A crown nut 100 is threaded onto the end 86 thereby axially retaining the latter. In the assembly thus formed, the pin connection 82 accommodates controlled arcuate movement of the mirror unit 26 relative to the support bar 24 about the horizontal axis 80.

For both rotatable connections, the washers 88 and 96 provide a low friction contact with their contacting members thereby permitting an easy and infinite positioning of the mirror unit 26 with respect to the support structure 22.

Referring to FIG. 3, the mirror unit 26 is moved between an inboard viewing position illustrated by the phantom lines to an outboard viewing position illustrated by the solid lines by rotating the support arm approximately 180° about the vertical axis 76. After such rotation, it will be appreciated that the mirror reflecting surface will be facing forwardly of the vehicle. To place a reflecting surface in the proper viewing position, the mirror unit 26 is rotated approximately 180° about the horizontal axis 80. Thus, by two simple rotational movements, the mirror unit 26 can be conveniently and easily located in either of the two viewing positions and, as most clearly shown in FIG. 1, the mirror unit is positioned below eye level in both positions thereby avoiding any interference with forward lateral vision.

As previously mentioned, the mounting bracket 56 is vertically offset with respect to the mirror unit 26. In other words and as most clearly shown in FIG. 3, when the mirror unit 26 is in the outboard viewing position and mounted on the driver side or left side of the vehicle, the major viewing portion of the mirror reflecting surface will be below the horizontal axis 80. Inasuch as the reflecting surface is located outwardly and downwardly from the window 20, the upper ledge of the door will not obstruct the operator's vision and he is able to utilize the full extent of the mirror reflecting surface for outward and rearward viewing. The eccentric mounting of the mirror unit 26 on the support arm 24 is equally important when the mirror assembly 16 is mounted on the right hand side or passenger side of the vehicle. For this installation, the distance between the operator and the mirror unit 26 is greatly increased such that if the mirror were similarly located with the major viewing portion of the reflecting surface below the upper ledge of the door 18, a significant portion of the reflecting surface would be obscured. However, the present invention provides a single mirror assembly that will accommodate mounting on either side of the vehicle without an impairing of the field of rearward vision. In other words, when the mirror assembly is located in the outboard position on the righthand side of the vehicle, the major portion of the reflecting surface will be above the horizontal axis 80 and the ledge of the door will not obstruct the field of vision in the manner described above. The fact that a small portion of the viewing surface will be obscured when the mirror unit is located in the inboard position is not considered to be significant inasmuch as adequate rearwad vision on the righthand side of the vehicle can be obtained through the rear window by using the interior rear view mirror.

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:

1. A rear view mirror assembly for use without modification on either the lefthand side or the righthand side of a motor vehicle, both sides of which include a door having a window, comprising: a mounting bracket having an inner end and an outer apertured end, said bracket adapted to be mounted on the door entirely below the window with said apertured end spaced laterally of the vehicle; a pair of struts having upper apertured ends registering with the first-mentioned apertured end and downwardly diverging lower ends adapted to be connected to the door; a rectangular mirror unit including a housing and mirror element having a reflecting surface which provides a field of view to the rear of the vehicle; an apertured bracket member attached to said housing and vertically offset with respect to said mirror unit to divide said reflecting surface into a major viewing portion and a minor viewing portion; an L-shaped mirror support bar having a vertical lower leg and a horizontal upper leg; a terminal end of reduced diameter on said upper leg journaled at said apertured end of said bracket member for permitting controlled arcuate movement of the mirror unit about a horizontal axis between a forwardly facing position and a rearwardly facing position so as to establish a vertical field of view, said vertical field of view on the lefthand side of the vehicle being provided by lacting said minor viewing portion of said reflecting surface above said horizontal axis and said vertical field of view on the righthand side of the vehicle being provided by 180° rotation of said miror unit to locate said major viewing portion above said horizontal axis; and a terminal end of reduced diameter on said lower leg journaled at the apertured ends of said mounting bracket and said struts for permitting controlled arcuate movement of said mirror unit and said support arm about a vertical axis such that said reflecting surface is horizontally shiftable toward and away from said door for establishing a lateral field of view, whereby said mirror position is universally adjustable on both sides of the vehicle by rotation of said support member about said vertical axis coupled with rotation of said mirror unit about said horizontal axis.

2. A rear view mirror assembly for use without modification on either the lefthand side or the righthand side of a motor vehicle, both sides of which include a door having a window, comprising: a mounting bracket having an apertured end, said mounting bracket adapted to be mounted on the door entirely below the window with said apertured end spaced laterally of the vehicle; a pair of struts having upper apertured ends registering with the first-mentioned apertured end and downwardly diverging lower ends adapted to be connected to the door; a mirror unit having a reflecting surface which provides a field of view to the rear of the vehicle; an apertured member connected to said mirror unit; an L-shaped mirror support member having a vertical leg and a horizontal leg; first frictionally yieldable means for supporting the terminal end of one of said legs at said apertured member for permitting controlled arcuate movement of the mirror unit about a horizontal axis between a forwardly facing position and a rearwardly facing position so as to establish a vertical field of view, said vertical field of view of the lefthand side of the vehicle being provided by 180° rotation of said mirror unit about said horizontal axis; and second frictionally yieldable means for supporting the terminal end of the other of said legs at the apetrtured ends of said mounting bracket and said struts for controlled arcuate movement of said mirror unit and said support arm about a vertical axis such that said reflecting surface is horizontally shiftable toward and away from said door for establishing a lateral field of view, whereby said mirror position is universally adjustable on both sides of the vehicle by rotation of said support member about said vertical axis coupled with rotation of said mirror unit about said horizontal axis.

3. The rear view mirror assembly recited in claim 2 wherein said second frictionally yieldable means comprises, a threaded shank at said terminal end of the other of said legs, said shank being inserted through said apertured ends to establish said vertical axis for said controlled arcuate movement, low friction washer members carried on said shank and engaging the mounting brackets and struts, and a nut member threaded onto said shank for applying a clamping action to said washer members thereby establishing a frictionally yieldable joint which permits infinite positioning about said vertical axis.

4. The rear view mirror assembly recited in claim 2 wherein said first frictionally yieldable means comprises, a horizontal aperture formed in said apertured member parallel to said reflecting surface, a threaded shank at said terminal end of said one of said legs, said shank being inserted through said horizontal aperture to establish said horizontal axis for said controlled arcuate movement, low friction washer members carried on said shank and engaging the apertured member, and a nut member threaded onto said shank for applying a clamping action to said washer members thereby establishing a frictionally yieldable joint which permits infinite positioning about said horizontal axis.

5. A rear view mirror assembly for a motor vehicle having a door including a window, comprising: a first bracket member having an inner end adapted to be mounted on the door and an outer end spaced laterally of the vehicle when said bracket is mounted thereon; a second bracket member having an inner end adapted to be connected to said door at longitudinally spaced positions which are vertically spaced with respect to said first mentioned inner end, said second bracket member laterally outwardly converging toward said first bracket member and having an outer end connected to said first bracket member; a mirror unit for providing a field of view to the rear of the vehicle; a support member having mutually perpendicular free ends; first frictional connecting means between one of said free ends and said mirror unit for mounting the latter for controlled arcuate movement about a horizontal axis so as to establish a vertical field of view; and second frictional connecting means between the other of said free ends and said outer end of said first bracket member for mounting said support member for controlled arcuate movement about a vertical axis such that said mirror unit is horizontally shiftable toward and away from said door for establishing a lateral field of view, whereby said mirror position is universally adjustable by rotation of said support member about said vertical axis coupled with rotation of said mirror unit about said horizontal axis.

6. In a motor vehicle having a door including a window, a rear view mirror assembly comprising: a first bracket member having an inner end and an outer end, said inner end adapted to be mounted on the door entirely below the window with said outer end spaced laterally of the vehicle; a vertical aperture in said outer end defining a vertical rotational axis; a second bracket member including a pair of strut members having outer ends in spaced relationship with the first-mentioned outer end and inwardly diverging inner ends adapted to be connected to the door; vertical apertures in the outer ends of said strut members registering with the vertical aperture in the outer end of said first bracket member; a mirror unit having a reflecting surface which provides a field of view to the rear of the vehicle; a third bracket member connected to said mirror unit; a horizontal aperture parallel to said reflecting surface in said third bracket member defining a horizontal rotational axis; an L-shaped mirror support member having a vertical leg and a horizontal leg; a terminal end including a threaded shank on said horizontal leg journaled at said horizontal aperture of said third bracket member for accommodating controlled arcuate movement of the mirror unit about said horizontal rotational axis; low friction washer members carried on the threaded shank and engaging said third bracket member; a nut member threaded onto said shank for applying a clamping action to said washer members thereby establishing a frictionally yieldable connection which permits infinite positioning about said horizontal rotational axis so as to establish a vertical field of view; a terminal end including a threaded shank on said vertical leg journaled at said vertical apertures on said first bracket member and said strut members for permitting controlled arcuate movement of said mirror unit and said support member about said vertical rotational axis; low friction washer members carried on said second mentioned threaded shank and engaging the outer ends of the first and second bracket members and a nut member threaded onto said second-mentioned shank for applying said clamping action to said washer members thereby establishing a frictionally yieldable connection which permits infinite positioning about said vertical rotational axis such that said reflecting surface is horizontally shiftable toward and away from said door for establishing a lateral field of view, whereby said reflecting surface is universally adjustable by movement of said support member about said vertical rotational axis coupled with movement of said mirror unit about said horizontal rotational axis.

7. A rear view mirror assembly for a motor vehicle having a door including a window, comprising: a first bracket member including an outer apertured end, said first bracket member adapted to be mounted on the door entirely below the window with said outer apertured end spaced laterally of the vehicle; a pair of strut members having outer apertured ends registering with the first-mentioned outer apertured end and inwardly diverging inner ends adapted to be connected to the door; a mirror unit having a reflecting surface which provides a field of view to the rear of the vehicle; an apertured member connected to said mirror unit; an L-shaped mirror support member having a vertical leg and a horizontal leg; a terminal end on one of said legs journaled at said apertured member; first frictionally yieldable means between said apertured member and said terminal end for permitting controlled arcuate movement of the mirror unit about a horizontal axis so as to establish a vertical field of view; and a terminal end of the other said leg journaled at said inner apertured ends of said bracket member and said strut members; second frictionally yieldable means between said apertured ends and said second mentioned terminal end for permitting controlled arcuate movement of said mirror unit and said support arm about a vertical axis such that said reflecting surface is horizontally shiftable toward and away from said door for establishing a lateral field of view, whereby said mirror position is universally adjustable by rotation of said support member about said vertical axis coupled with rotation of said mirror unit about said horizontal axis.

References Cited

UNITED STATES PATENTS

| | | | |
|---|---|---|---|
| 1,576,037 | 3/1926 | Colbert et al. | 248—481 |
| 2,552,074 | 5/1951 | Thompson | 248—279 |
| 2,626,771 | 1/1953 | Krohm | 248—226 R |
| 3,119,591 | 1/1964 | Malecki | 248—282 |
| 3,142,469 | 7/1964 | Clemmer | 248—487 |
| 3,168,277 | 2/1965 | Stewart | 248—480 X |

FOREIGN PATENTS

| | | | |
|---|---|---|---|
| 1,024,701 | 4/1966 | Great Britain | 248—479 |

ROY D. FRAZIER, Primary Examiner

U.S. Cl. X.R.

248—278